Dec. 10, 1946.    R. E. CROOKE    2,412,443
COMPUTING FIRE CONTROL DATA
Original Filed Oct. 6, 1933    5 Sheets-Sheet 1

INVENTOR
Raymond E. Crooke
BY Walter J. Gill
ATTORNEY

Dec. 10, 1946.   R. E. CROOKE   2,412,443
COMPUTING FIRE CONTROL DATA
Original Filed Oct. 6, 1933   5 Sheets-Sheet 4

INVENTOR
*Raymond E. Crooke*
BY
*Walter J. Gill,*
ATTORNEY

INVENTOR
Raymond E. Crooke
BY
Walter J. Gill
ATTORNEY

Patented Dec. 10, 1946

2,412,443

UNITED STATES PATENT OFFICE 2,412,443

COMPUTING FIRE CONTROL DATA

Raymond E. Crooke, New York, N. Y., assignor to Ford Instrument Company, Inc., Long Island City, N. Y., a corporation of New York Application October 6, 1933, Serial No. 692,369
Renewed January 3, 1936

21 Claims. (Cl. 235—61.5)

This invention relates to the computing of certain data for use in controlling the fire of ordnance and while especially intended for use with apparatus for controlling ordnance used against aerial targets, it may be employed with apparatus for controlling ordnance used against surface targets.

In general, the solution of fire control problems includes three major steps which in brief are as follows:

The first step is to ascertain the position of the target in space at any instant. In the case of a surface target its position may be determined in the two coordinates of bearing and range, but in the case of an aerial target a third coordinate, namely, elevation, is required in order to completely determine the position of the target.

The second step is to predict in terms of the coordinates in which the actual position of the target is ascertained the position of the target at the end of the time of flight of the projectiles in order that the latter shall burst as closely to the target as possible when the gun is aimed in accordance with the predicted position of the target.

The third step is to apply to the gun further corrections, such as those due to its ballistics, for tilt of its trunnions, and for parallax, in order to still further increase the accuracy of the aiming of the gun.

The solution of the second step of the problem usually includes the determination of the course and speed of the target since its position at the end of the time of flight of a projectile will depend upon these factors. The values of these factors are also needed as a basis for continually generating, usually by means of an instrument known as a range keeper, the values of bearing and range, and, in the case of an aerial target, its elevation, to furnish information whereby the position of the target may be known during the intervals between observations or when it becomes temporarily obscured.

It is to the second step in the solution of the fire control problem that the present invention relates and more particularly to apparatus for accurately determining the course and speed of a target in order that these quantities may be used in connection with the determination of its predicted position and the generation of the values of the quantities on which its position depends, such as bearing and range and in the case of an aerial target its elevation.

Briefly described, the invention provides apparatus by which the estimated course and speed of a target may be resolved into components which represent the rates of change of bearing, range and, in the case of an aerial target, elevation. The apparatus then generates from these rates the bearing, range and elevation of the target and provides a means by which the values of these quantities may be compared with their measured or observed values until the generated and measured values maintain agreement, under which conditions the course and speed will have been accurately determined for use in connection with predicting mechanism.

The particular nature of the invention, as well as other objects and advantages thereof, will appear most clearly from a description of a preferred embodiment as shown in the accompanying drawings in which.

Figure 1:
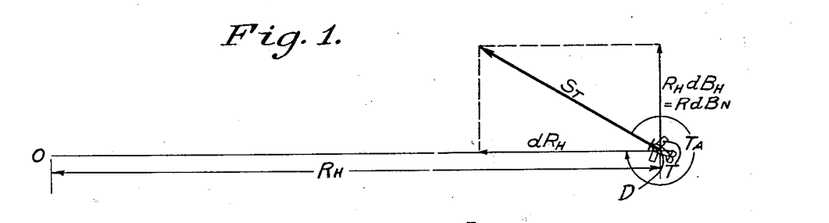
Figs. 1, 2, 3 and 4 are diagrams to be used in connection with an explanation of the problem involved herein.

The problem presented by this case will appear most clearly from an explanation of Figs. 1, 2, 3 and 4 in all of which O represents the observing station on land or on shipboard, as the case may be, and T represents an aerial target, such as an airplane. Fig. 1 is a plan view representing the problem as viewed from a distant point above the surface of the earth, in which case the problem will appear as projected on the surface of the earth since all vertical components will not appear as such. The target T will therefore appear to be located at a point D on the surface of the earth. The line O—D will therefore represent the projection on the earth of the line of sight between the observing station and the target, so that its length $R_H$ represents the horizontal range of the target from the station.

$S_T$ is defined as a vector representing in direction the course of the target and in magnitude the speed of the target as seen from the distant point. In other words $S_T$ is the speed of the target in the horizontal plane. The vector $S_T$ is shown as having been resolved into two rectangular components, one, $dR_H$, along the horizontal projection of the line of sight and representing the rate of change of the horizontal range $R_H$. The other component, $R_H dB_H$, which is at right angles to the projection O—D of the line of sight, represents the linear rate of change of movement across the line of sight and will be hereinafter referred to as the linear deflection component. The angle designated $T_A$, between the vector $S_T$ and the projected line of sight O—D is known as the target angle.

Figure 2:
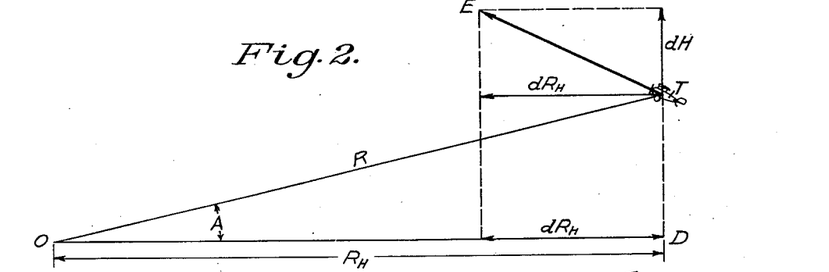

Fig. 2 is an elevation view representing the problem as viewed from a distant point at right angles to the horizontal projection of the line of sight and showing the target T located at an angle of elevation A above the surface of the earth. The line O—T in this case represents the actual or slant range R of the target, while the line O—D represents the horizontal range $R_H$, that is, the range represented by the line O—D of Fig. 1. The vector $S_T$ of Fig. 1 which represents the course and speed of the target as viewed from a point above the surface of the earth will appear in Fig. 2 as a vector E—T. This vector is resolved into two rectangular components, one $dR_H$, being the same as in Fig. 1 and representing the rate of change of the horizontal range and the other, $dH$, representing the rate of change in height H, or the rate of climb as it is sometimes called, due to a vertical component of the movement of the target, which, since it is an aerial one, may have such a component. The length of the vector E—T will accordingly be expressed by $$\sqrt{(dR_H)^2 + (dH)^2}$$

Figure 3:
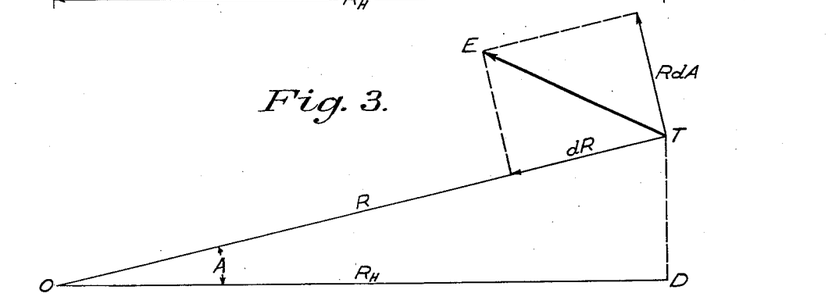

Since the range R is measured along the line of sight O—T and the linear change of elevation is measured at right angles to this line and in a vertical plane, it is necessary, as appears in Fig. 3, in order to obtain a basis of comparison of the rates of change of these factors, to resolve the vector E—T into two rectangular components, one, $dR$, along the line O—T and representing the rate of change of range R, and the other, $RdA$, representing in linear measure the rate of change of movement of the target perpendicular to the line of sight and in a vertical plane containing the line O—T.

Figure 4:
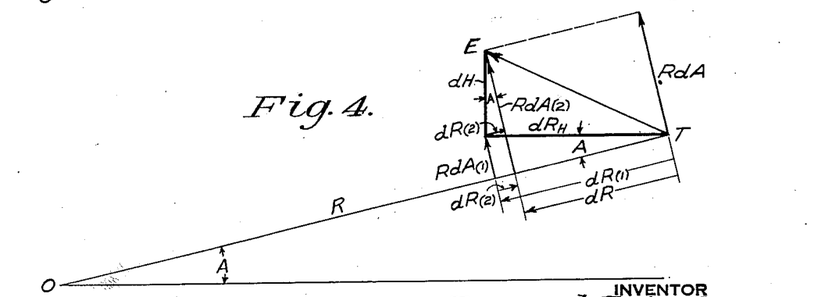

Fig. 4 shows the manner in which the components of Fig. 3 may be obtained from the components of Fig. 2. The component $dR$ of Fig. 2 is resolved into a component $dR(1)$ along the line O—T and a component $RdA(1)$ at right angles thereto, both of these resulting components being in linear measure. The component $dH$ of Fig. 2 is resolved into a component $dR(2)$ parallel to the line O—T and a component $RdA(2)$ at right angles thereto. It is evident that $dR$ is the algebraic sum of the components $dR(1)$ and $dR(2)$, the component $dR(2)$ being regarded as negative since it is measured in the opposite direction to that in which the component $dR(1)$ is measured from the point T.

Component $dR(1)$ is equal to $dR_H \cos A$ and component $dR(2)$ is equal to $dH \sin A$, so that (1) $\quad dR = dR_H \cos A + dH \sin A$ Component $RdA(1)$ is equal to $dR_H \sin A$ and component $RdA(2)$ is equal to $dH \cos A$, so that (2) $\quad RdA = dR_H \sin A + dH \cos A$ It has been explained above that the components $dR_H$, $RdA$ and $R_H dB_H$ of the course and speed of the target are rates of change expressed in linear measure of the quantities which they represent. Since bearing and elevation, which are two of the quantities used to determine the position of the target, are measured in units of angular measure, it is necessary to convert the linear components $RdA$ and $R_H dB_H$ into quantities representing such rates of change of angular movement in order that the bearing and elevation generated by the apparatus may be compared with the measured bearing and elevation to accomplish the purpose of the invention.

In as far as the component $RdA$ is concerned, it is multiplied by the reciprocal of range, that is, $$\frac{1}{R}$$

which gives (3) $\quad RdA \times \frac{1}{R} = dA$ which is the angular elevation rate. If $dA$ be multiplied by time, $t$, increments of elevation $\Delta A$ will be obtained which may be compared with the observed elevation in order to furnish a basis for changing the estimated course and speed of the target until the values of elevation generated in the apparatus agree with the measured values of this same quantity, as will hereinafter be explained in detail.

It has been explained in connection with Fig. 1, that $R_H dB_H$ is a linear component of the vector $S_T$ at right angles to the line O—D and referred to a horizontal plane. This component is equal to a linear component represented by $RdB_N$ in which R is the actual range and $dB_N$ is the rate of change of angular deflection in the inclined plane which contains the line of sight.

From Fig. 2

$$\cos A = \frac{R_H}{R}$$

or $R_H = R \cos A$. $R_H dB_H$ may therefore be written $R \cos A dB_H$. Since $R_H dB_H = R dB_N$ it follows that (4) $\quad RdB_N = R \times \cos A \times dB_H$ or (5) $\quad dB_H = \frac{1}{R} \times \sec A \times RdB_N$ In the apparatus disclosed the horizontal course and speed of the target are resolved into a linear component $dR_H$ and another linear component $RdB_N$. This last named component is then converted into the angular component $dB_H$ by multiplying it by $$\frac{1}{R}$$

and sec A in accordance with Equation 5. This gives the angular bearing rate $dB_H$ in the horizontal plane. This rate when multiplied by increments of time, $\Delta t$, will give increments of bearing $\Delta B$ for comparison with the observed bearing.

Before describing the structure and operation of the apparatus as a whole, as disclosed in Figs. 5 and 6, the differentials which are shown diagrammatically in these figures will be described in detail by reference to Fig. 7. Certain other devices shown diagrammatically in Figs. 5 and 6, will be subsequently described in detail by reference to Figs. 10 to 13, inclusive, while references to patents showing other devices in detail will be made at appropriate places in the following specification.

Figure 7:
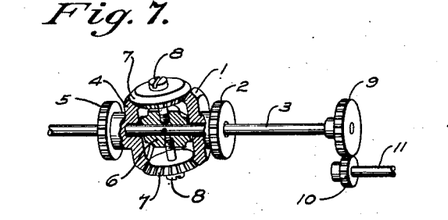
Fig. 7 is a perspective view showing in detail the construction of the differentials used in the apparatus and represented conventionally in Figs. 5 and 6.

Referring to Fig. 7 which shows a differential of the bevel gear type, 1 is a bevel gear which has integrally formed therewith a spur gear 2 adapted to connect the gear 1 to any desired external device. The combination gear just described is rotatably mounted on a shaft 3. A similar combination gear consisting of a bevel gear 4 and a spur gear 5 is also rotatably mounted on shaft 3. A member 6 is attached to the shaft and carries a pair of bevel gears 7 rotatably mounted on screws 8 attached to the member 6. One end of shaft 3 carries a gear 9 meshing with a gear 10 of half the diameter of gear 9 and which is carried by a shaft 11 connected to another external device. The combination gears 1—2 and 4—5 are commonly known as the sides of the differential, while the part composed of member 6, bevel gears 7 and screws 8 is usually referred to as the center or spider.

In the operation of the differential described above let it be assumed that the side 1—2 is rotated from any source through one revolution while the side 4—5 is held fixed. The center will rotate a half of a revolution in the same direction and correspondingly turn the shaft 3. If, on the other hand, the side 1—2 be fixed and the side 4—5 be rotated through one revolution in the same direction as the side 1—2 was previously rotated, the center will turn another half revolution in the same direction as it previously turned. As a result of these movements the center will have turned one complete revolution and the shaft 11 by virtue of the gear ratio between the gears 9 and 10, will turn two revolutions, that is, the sum of the revolutions of the sides 1—2 and 4—5.

Any other amount of movement of the sides in the same direction will cause the shaft 11 to rotate according to the sum of these movements. In other words, the center of the differential will furnish an output which is one-half of the sum of the inputs supplied to the two sides of the differential. The gears 9 and 10, however, double the output of the center of the differential so that the output of the center is actually the sum of the inputs at the two sides of the differential. If the sides are moved in opposite directions the center will move in accordance with the difference between the movement imparted to the sides, or, in other words, the center will subtract the lesser movement from the greater movement. In any event, the shaft 11 will give an output equal to the algebraic sum of the movements imparted to the two sides.

Figure 5:
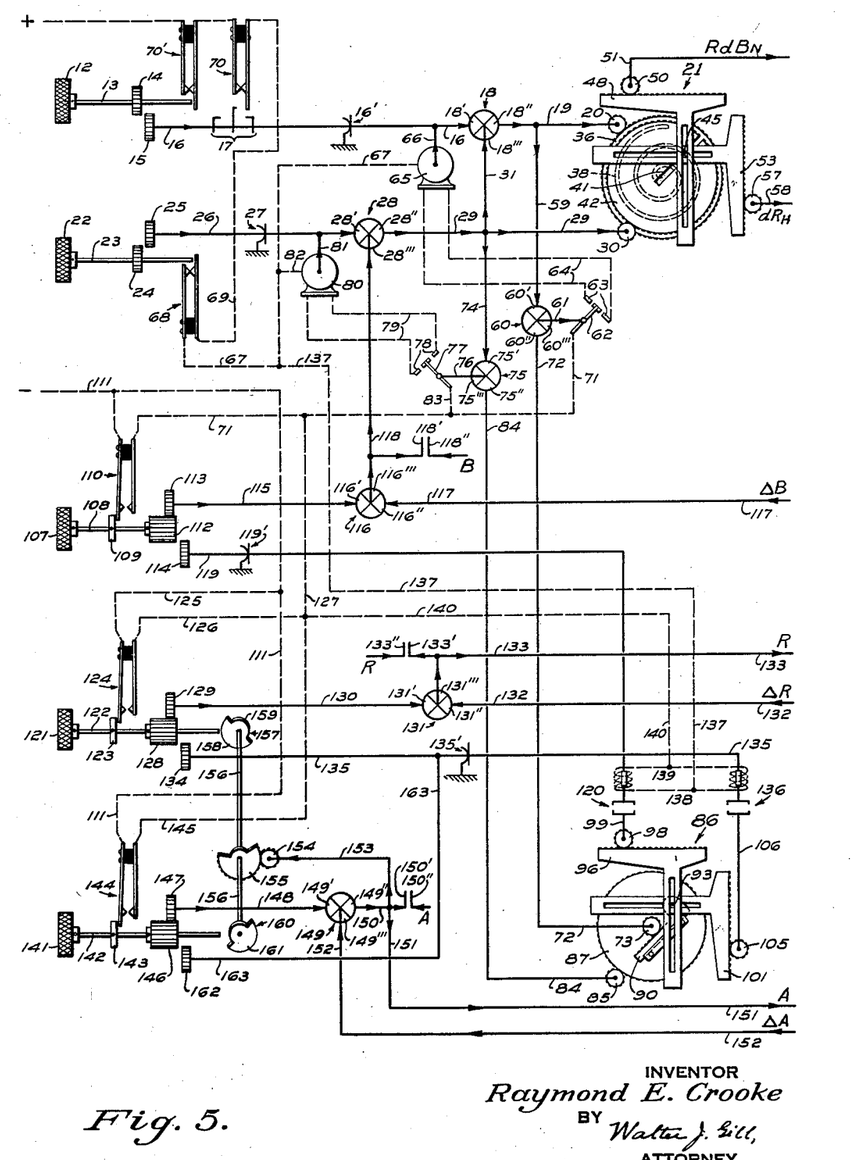
Fig. 5 is a schematic representation of a portion of the apparatus.
Figure 6:
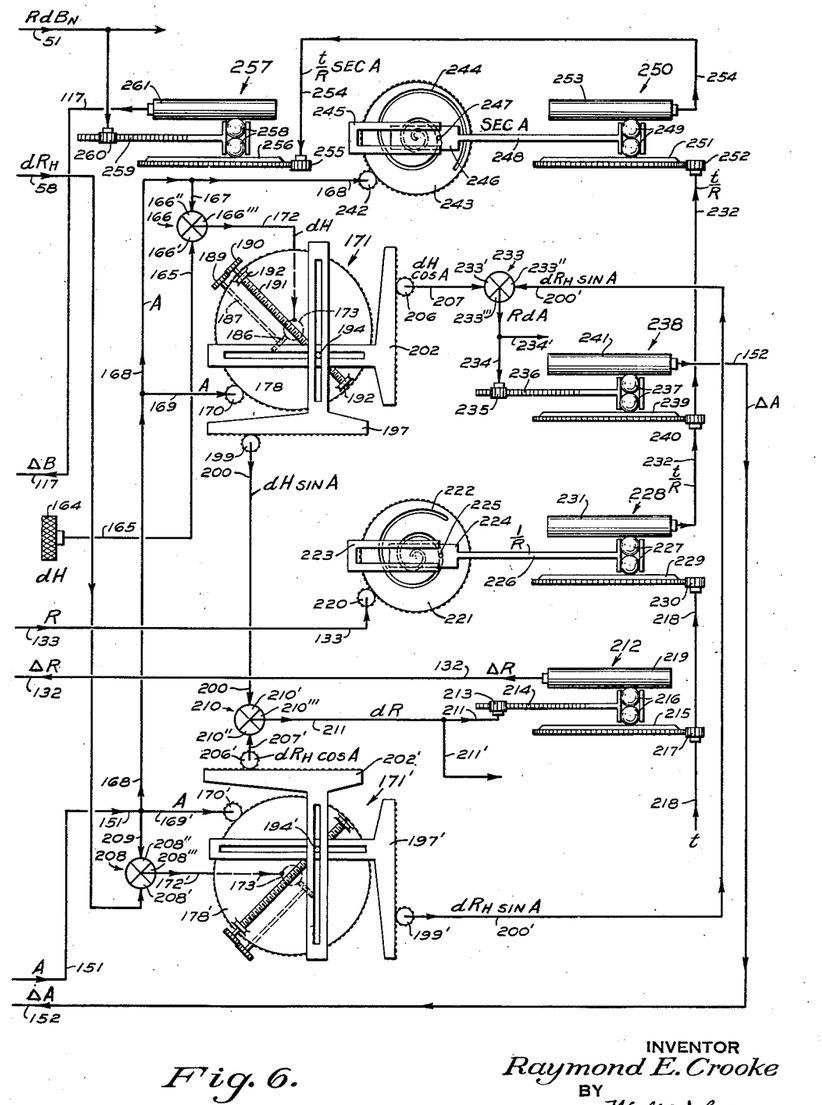
Fig. 6 is a similar representation of the remainder of the apparatus.
Figure 8:
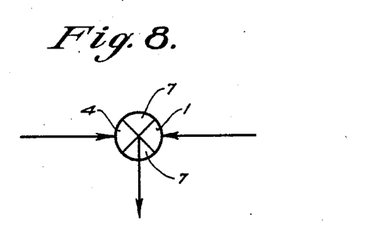
Figs. 8 and 9 show the conventional representations of the differential as employed in Figs. 5 and 6.

Fig. 8 shows a symbol used in Figs. 5 and 6 for representing the differential under the conditions described above. The inwardly directed arrows at the right and left indicate inputs to the sides of the differential and the vertical arrow leading from the center indicates the output of the differential.

Figures 9, 10, 11:
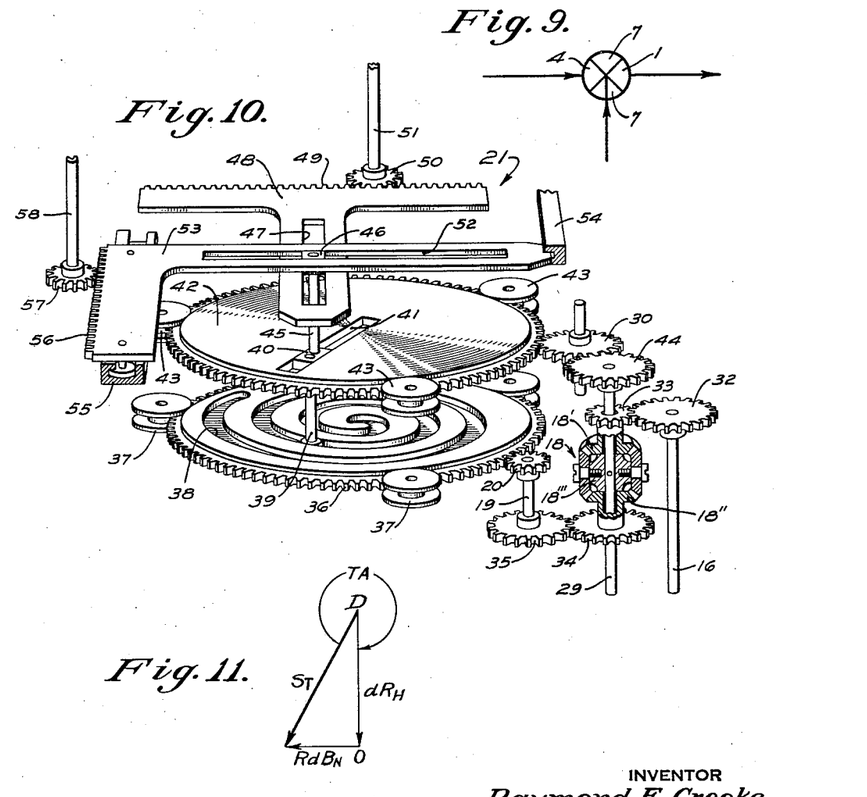
Fig. 10 is a perspective view showing the structural details of a device known as a component solver and which is illustrated diagrammatically in Fig. 1.
Fig. 11 is a vector diagram to be used in connection with the description of the device shown in Fig. 10.

It is not necessary that the center always furnish the output of the differential for it and one of the sides may receive the inputs and the other side will then furnish the output which will likewise be the algebraic sum of the inputs. Fig. 9 is a symbol used in Figs. 5 and 6 for representing the differential under this other condition. In this case the left hand arrow indicates an input to the corresponding side of the differential while the vertical arrow indicates an input to its center. The outwardly directed right hand arrow then indicates an output from the other side of the differential.

In subsequent references to the two types of differentials illustrated by the symbols of Figs. 8 and 9, the differential as a whole will be designated by a reference character. The sides of the differential will be designated by the same numbers primed and double primed and its center by the same number triple primed.

Referring to Fig. 5, 12 is a knob settable in accordance with the estimated horizontal speed of the target. The knob is attached to a shaft 13 carrying a gear 14 adapted to be selectively engaged with a gear 15 by longitudinal movement of the shaft 13 by suitable manipulation of the knob 12. The gear 15 is attached to the end of a shaft 16 which is provided with a suitable friction device 16' to prevent accidental turning of the shaft. The shaft 16 is also provided with a mechanical stop 17 for limiting the turning of the shaft between certain values of target speed, as for instance, between 0 and 220 knots per hour. As an instance of a stop which may be employed reference is made to Patent No. 1,317,914, Hannibal C. Ford, Apparatus for transmitting motion from one movable member to another, page 2, lines 80–84. The shaft 16 is connected to one side 18' of a differential 18, the other side 18" of which is connected to a shaft 19 leading to a pinion 20 for actuating a part of a device known as a component solver and designated as a whole by 21, this device being illustrated in detail in Fig. 10 to which reference will presently be made.

22 designates a knob adapted to be set in accordance with the estimated true course of the target, namely, the course of the target referred to the north as a datum. This knob is carried on the end of a shaft 23 provided with a gear 24 adapted to be selectively engaged with a gear 25 by longitudinal movement of the shaft 23. The gear 25 is attached to the end of a shaft 26 which is provided with a friction device 27 and is connected to the side 28' of a differential 28. As will presently appear, the center 28''' of this differential is movable in accordance with the true bearing of the target, namely, the bearing of the target referred to the north. The other side 28" therefore receives a movement equal to the target angle TA. In further explanation of the relationship between the quantities mentioned above, reference is made to Patent No. 1,827,812, Hannibal C. Ford, Range and bearing keeper, and particularly to Fig. 13 and the explanation thereof. Side 28" is connected to a shaft 29 carrying a pinion 30 for actuating another part of the component solver 21. A shaft 31 is connected between shaft 29 and the center 18''' of the differential 18.

Referring to Fig. 10 showing in more detail the principal elements of the component solver 21 and the differential 18 associated therewith, the shaft 16, corresponding to the similarly designated shaft of Fig. 5, carries a gear 32 engaging a pinion 33 on the side 18' of the differential 18. The shaft 29 of Fig. 10 represents the similarly designated shaft of Fig. 5 and also the shaft 31 leading to the center 18''' of the differential 18, since in Fig. 10 the center is shown as connected directly to shaft 29. The side 18" of the differential carries a gear 34 engaging a gear 35 on a shaft 19 carrying a pinion 20, these last two elements corresponding to the similarly designated parts of Fig. 5. The pinion 20 engages teeth on the periphery of a disk 36 held in position by suitably supported guide rollers 37. The disk is provided with a cam groove 38 designed to displace a pin 39 extending into it in accordance with the speed of the target when the disk is turned by manipulation of the knob 12 of Fig. 5 with the gears 14 and 15 in engagement.

The pin 39 is attached to a carriage 40 suitably mounted in a radial slot 41 in a disk 42 supported by guide rollers 43 and provided with teeth on its periphery engaging a gear 30, corresponding to the similarly designated element of Fig. 5, which engages a gear 44 on the end of the shaft 29. The disk 42 will therefore be rotated in accordance with the target angle since this quantity is the output of the differential 28 as previously explained.

The carriage 40 carries another pin 45 offset radially from the pin 39 so that the latter can never reach the center of the disk 36 although pin 45 may go to the center of the disk 42 under certain conditions, such as zero target speed. If the pin 39 were able to reach the center of its disk, it would remain there since rotation of the disk would not dislodge it. The pin 45 is connected to a block 46 the lower portion of which lies in a slot 47 in the arm of a T-shaped slide 48 provided with a rack 49 engaging a pinion 50 on a shaft 51 leading from the component solver, as shown in Fig. 5, to apparatus shown in Fig. 6 as will hereinafter appear, as well as to the predicting apparatus which may be associated with the disclosed apparatus. The slide 48 is arranged perpendicularly to a datum line in the device representing the horizontal projection of the line of sight O—D of Fig. 1. This means that the movement of the slide represents the component $RdB_N$ which, as previously described, is a linear deflection component equal to $R_H dB_H$ of Fig. 1. From Fig. 1 it will be seen that $R_H dB_H = S_T \sin T_A$. The upper portion of the block 46 lies within a slot 52 in one arm of an L-shaped slide 53 mounted in guideways 54 and 55. One arm of this slide is provided with a rack 56 engaging a pinion 57 on an output shaft 58 leading from the component solver of Fig. 5 to elements of Fig. 6. The slide 53 is arranged to move perpendicularly to the slide 48 from which it follows that its movement is along the datum line representing the line of sight in the device. This means that the movement of slide 53 represents the component $dR_H$ of Figs. 1 and 2. From Fig. 1 it will be seen that $$dR_H = S_T \cos T_A$$

As previously explained, the shaft 16 is operated in accordance with the estimated horizontal speed of the target. Assuming that the shaft 29 is stationary the rotation of shaft 16 will through gear 32 and pinion 33 correspondingly turn the side 18' of differential 18. Since the center 18''' is fixed under the conditions assumed, the side 18" will turn and through gears 34 and 35, shaft 19 and pinion 20, turn the disk 36 to position the pin 39, carriage 40 and pin 45 radially of this disk and the disk 42 in accordance with the estimated speed of the target.

If, on the other hand, the shaft 16 be assumed stationary and shaft 29 be turned in accordance with the estimated target angle, the side 18' of the differential 18 will be fixed. The shaft 29 will, through gears 44 and 30, turn the disk 42 to alter the angular position of the slot 41 in accordance with the estimated target angle. At the same time the center 18''' of the differential 18 which is attached to the shaft 29, will drive the side 18" and through gears 34 and 35, shaft 19 and pinion 20, the disk 36 will be turned in unison with the disk 42 to maintain the carriage 40 in the position to which it had previously been set by operation of shaft 16. The angular position of the slot 41 and the carriage 40 therein will be altered, but the radial distance of the carriage 40 from the center of the disk will remain constant as it should under the assumed conditions in which the target speed is not changing. It is evident that either the estimated speed of the target or the estimated target angle may be set up in the component solver separately by rotation of one or the other of shafts 16 or 29, or these quantities may be simultaneously set up in the device by joint operation of these shafts.

Under all conditions of operation the movement imparted to the carriage 40 will, through the pin 45, correspondingly position the block 46 which will in turn displace the slides 48 and 53 in accordance with the components of the course and speed of the target which they represent, namely, $RdB_N$ and $dR_H$, these outputs being transmitted by shafts 51 and 58 respectively to other parts of the apparatus.

Fig. 11 is a vector diagram in which the line O—D represents the direction in the device of the datum line which corresponds to the horizontal projection of the line of sight in Fig. 1 and $S_T$ is the vector representing the course and speed of the target as set up in the device. The length of the component O—D represents the movement imparted to the slide 53 which is a movement along the projection of the line of sight and represents the rate of change of the horizontal range $dR_H$. The length of the component at right angles to the component O—D represents the movement imparted to the slide 48, that is, the movement at right angles to the horizontal projection of the line of sight, and representing the rate of change of bearing expressed in linear measure, that is, $RdB_N$.

Referring to Fig. 5, a shaft 59 is connected to the shaft 19 and to the side 60' of a differential 60. The center 60''' of the differential is connected by a shaft 61 to the rotatable contact arm 62 adapted to engage one or the other of a pair of fixed contacts 63 connected by conductors 64 to a reversible motor 65 of any suitable type, the shaft 66 of which is connected to the shaft 16. A common conductor 67 leads from the motor to one blade of a switch 68. This blade and the co-acting blade carry contact points which are adapted to be separated by inward movement of the shaft 23, the free end of which then engages and moves the longer contact blade. This latter blade is connected by a conductor 69 to the longer blade of a similar switch 70 adapted to be separated from its shorter blade by the travelling member of the stop 17 as it approaches its lower limit of movement. The shorter blade of this switch is connected to the longer blade of a similar switch 70' adapted to be separated from its shorter blade by inward movement of shaft 13. The shorter blade of switch 70' is connected to the + terminal of a source of current. The contact arm 62 associated with the differential 60 is connected by a conductor 71 to other switches to be hereinafter described, by which the circuit of the motor may be established under certain conditions.

In the operation of the differential 60 the movement imparted to the side 60' by the shaft 59 will turn the center 60''', the shaft 61 and the arm 62 until it engages one of the fixed contacts 63 to prevent further movement of the center so that the movement imparted to the side 60' will be transmitted to the other side 60'' and to a shaft 72. As an illustration of a form of differential which may also be employed for this purpose, reference is made to Patent No. 1,842,160, Hannibal C. Ford, for Speed and distance indicator, in which the differential is designated 25.

Figure 12:
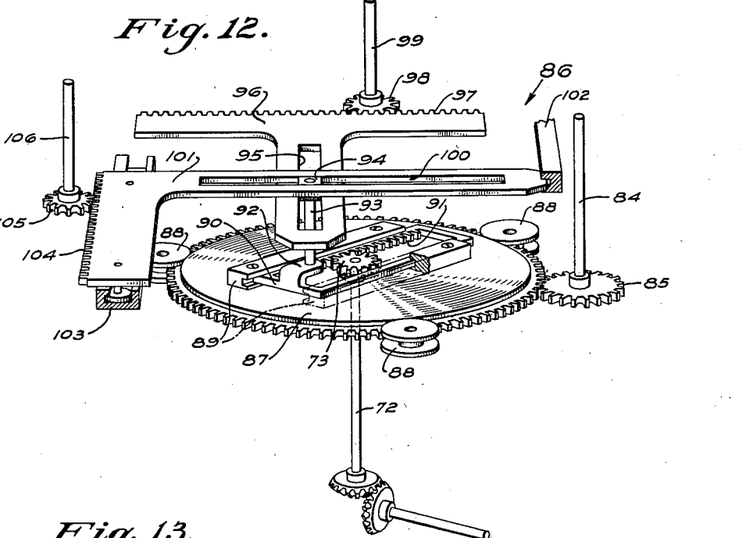
Fig. 12 is a view similar to Fig. 10 but showing another device known as a vector solver which is also shown diagrammatically in Fig. 1.

The shaft 72 leads to a pinion 73 for driving certain elements of a device known as a vector solver and shown in more detail in Fig. 12. This device resembles the component solver 21 to the extent that by means of input shafts and gears a pin may be positioned in direction and magnitude in accordance with a vectorial representation of a quantity, and will displace output slides in accordance with certain components of the vector represented by the position of the pin. The vector solver, however, differs from the component solver in being reversible so that under certain conditions the slides become input elements and may be set in accordance with components to position a pin in accordance with the vector corresponding to such components. The parts which in the component solver are associated with the pin to position it, then become the output elements of the vector solver.

Referring to Fig. 5, a shaft 74 is connected to the shaft 29 and the side 75' of a differential 75 similar to the differential 60. The center 75''' is connected by a shaft 76 to a contact arm 77 adapted to move between a pair of fixed contacts 78 from which conductors 79 lead to a reversible motor 80, the shaft 81 of which is connected to the shaft 26. The common conductor 82 of this motor leads to the conductor 67. The contact arm 77 is connected by a conductor 83 to the conductor 71. The side 75'' of the differential 75 is connected by a shaft 84 to a pinion 85 operating elements of the vector solver which is designated generally by 86.

Referring to Fig. 12, the shaft 72 and pinion 73 correspond to the similarly designated elements in Fig. 5 and the same is true of shaft 84 and pinion 85. The last named pinion engages teeth on the periphery of a disk 87 mounted in guide rollers 88. The disk 87 carries a pair of symmetrically arranged guide ways 89 between which is slidably mounted a carriage 90 provided with a rack 91 engaging the pinion 73 on the shaft 72 which extends through an aperture in the center of the disk. The carriage is provided at one end with a bracket 92 which carries a pin 93 attached to a block 94. The lower portion of the block 94 lies within a slot 95 in one arm of a T-shaped slide 96 provided with a rack 97 engaging a pinion 98 on a shaft 99.

The upper portion of the block 94 fits within a slot 100 in one arm of an L-shaped slide 101 mounted in guide ways 102 and 103. The slide is provided with a rack 104 engaging a pinion 105 on a shaft 106.

By virtue of the construction described above, the pin 93 of the vector solver 86 will be positioned similarly to the pin 45 of the component solver 21 since the input from shafts 59 and 72 will be substantially the same as the input from shaft 19 to the component solver. Similarly, the input from shafts 74 and 84 to the vector solver will be substantially the same as the input from shaft 29 to the component solver. Since the shaft 59 is connected to the shaft 19 on the output side of the differential 18, the latter will perform the same function with respect to the vector solver as previously described in connection with the component solver.

Resuming consideration of Fig. 5, a knob 107 adapted to be set in accordance with the true bearing, B, of the target, is carried upon a shaft 108 which is adapted to be displaced longitudinally. The shaft carries a collar 109 adapted, when the shaft is moved inwardly, to move the longer blade of a switch 110 into engagement with its shorter blade to establish a circuit between conductor 71 which is connected to the shorter blade, and a conductor 111 leading to the — terminal of the source of supply. Attached to the other end of shaft 108 is a gear 112 engaging a gear 113, the face of the former gear being wide enough to maintain it in engagement with the latter gear when the shaft 108 is moved inwardly sufficiently to close the switch, at which time the gear 112 additionally engages a gear 114.

The gear 113 is on the end of a shaft 115 leading to the side 116' of a differential 116. The other side 116'' is connected to a shaft 117 leading to elements of the apparatus shown in Fig. 6. The center 116''' is connected by a shaft 118 to the center 28''' of the differential 28. The shaft 118 drives a pointer 118' co-acting with a pointer 118'' driven in accordance with the true bearing of the target as observed by a suitable device, such as a director, forming part of the fire control system with which the present apparatus may be used. The gear 114 is attached to a shaft 119 which is provided with a friction device 119' and is connected to the driving element of an electromagnetic clutch 120 which is shown diagrammatically since it may be of any suitable construction. The driven member of this clutch is connected to the shaft 99 of the vector solver 86.

A knob 121 settable in accordance with range, R, of the target is attached to one end of a longitudinally displaceable shaft 122 carrying a collar 123 adapted to engage the longer blade of a switch 124. This blade of the switch is connected by conductor 125 to the conductor 111 and the shorter blade is connected by conductor 126 to the conductor 127 leading to the conductor 71. The shaft 122 carries a wide faced gear 128 continually in engagement with a gear 129 on a shaft 130 which is connected to the side 131' of a differential 131. The other side 131'' and the center 131''' are connected to shafts 132 and 133 respectively, which lead to elements of the apparatus shown in Fig. 6. A pointer 133' on the shaft 133 co-acts with a pointer 133'' driven in accordance with the range as observed by a suitable instrument, such as a range finder.

A gear 134 adapted to be engaged with the gear 128 when the shaft 122 is moved inwardly is attached to a shaft 135 provided with a friction device 135' and leading to the driving element of an electro-magnetic clutch 136, the driven element of which is attached to the shaft 106 of the vector solver 86. The circuits of the solenoids of the clutches are established in part over a conductor 137 leading from the conductor 67, and connected to a conductor 138 leading to the terminals of the solenoids. The other terminals of the solenoids are connected by a conductor 139 to a conductor 140 leading to the conductor 127.

A knob 141 settable in accordance with the elevation, A, of the target is attached to a longitudinally displaceable shaft 142 carrying a collar 143 adapted to engage the longer blade of a switch 144 to bring it into engagement with the shorter blade to establish a circuit including a conductor 145 attached thereto and leading to conductor 127. The conductor 111 is attached to the longer blade. The shaft 142 carries a wide faced gear 146 continually in engagement with a gear 147 on a shaft 148 connected to the side 149' of a differential 149. The other side 149'' is connected by a shaft 150 to a shaft 151 leading to elements of the apparatus shown in Fig. 6. The center 149''' is driven by the shaft 152 leading from elements of the apparatus shown in Fig. 6. The shaft 150 carries a pointer 150' co-acting with a pointer 150'' driven in accordance with the elevation of the target as observed by a suitable instrument, such as a director.

Connected to the shaft 150 is a shaft 153 leading to a pinion 154 engaging a gear sector 155 on a shaft 156 which carries at its upper end a cam 157 having a portion 158 of greater radius and lying in the path of the inward movement of the shaft 122 under certain conditions, as determined by the position of shaft 156, and a portion 159 of lesser radius permitting the inward movement of the shaft under other conditions. A similar cam 160 is attached to the other end of the shaft 156. In general this cam has its portion of greater diameter 161 disposed in such a relation to the corresponding portion 158 of cam 157 as to permit the shaft 142 to be moved inwardly when such movement of the shaft 122 is prevented by the portion 158 of cam 157 or vice versa, but the cams are so proportioned that for certain positions of the shaft 156 as will be explained more fully hereinafter, either of the shafts 122 or 142 may be moved inwardly without obstruction by the portions 158 and 161 respectively. The gear 146 is adapted, when its shaft 142 is moved inwardly, to engage a gear 162 on the end of a shaft 163 connected to the shaft 135 whereby the driving member of the clutch 136 of the vector solver may be selectively operated by the knob 121 or by the knob 141.

Continuing the explanation of the simplified diagram of the apparatus, reference will now be made to Fig. 6. A knob 164 adapted to be set in accordance with the estimated rate of change of height, or rate of climb, $dH$, is connected by a shaft 165 to the side 166' of a differential 166, the other side of which 166' is connected by a shaft 167 to a shaft 168 which is in turn connected to the shaft 151 leading from Fig. 5 and which is operated in accordance with the elevation, A, by operation of the knob 141 as will hereinafter be described in more detail. A shaft 169 connected to the shaft 168 leads to a pinion 170 engaging an element of a component solver 171 which is shown in more detail in Fig. 13 which will presently be described. The center 166''' of the differential 166 is connected by a shaft 172 to a pinion 173 for operating another element of the component solver 171.

Figure 13:
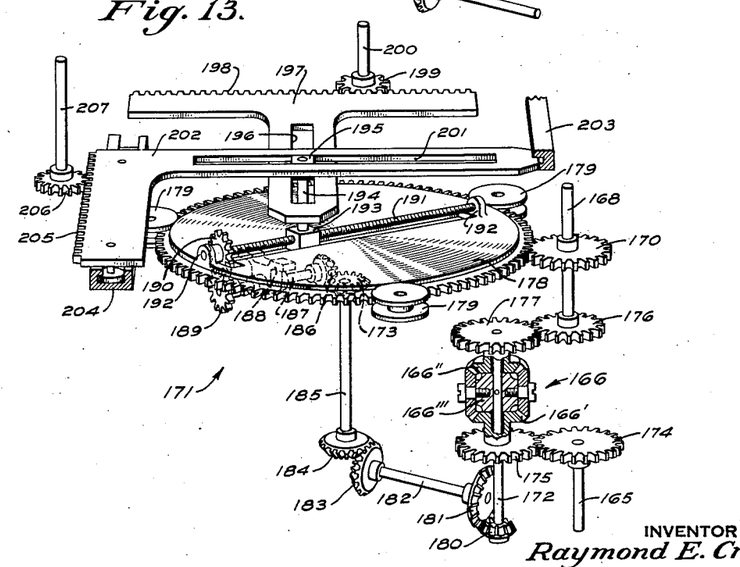
Fig. 13 is a similar view of another form of component solver of which two are shown diagrammatically in Fig. 6.

Referring to Fig. 13, the shaft 168 corresponds to the similarly numbered shaft in Fig. 6, but is shown as being connected directly to the pinion 170 instead of by the interposition of shaft 169 of Fig. 6. The shaft 165 of Fig. 13 corresponding to the similarly numbered shaft in Fig. 6, carries a gear 174 engaging a gear 175 attached to the side 166' of the differential 166. The shaft 168 is, in Fig. 13, shown as being connected directly to a gear 176 engaging a gear 177 connected to the side 166'' of the differential, instead of being connected thereto by the shaft 167 in Fig. 6.

The gear 170 engages teeth on the periphery of a disk 178 rotatably mounted in suitable guide rollers 179. The center 166''' of the differential is connected to a shaft 172 corresponding to the similarly numbered shaft in Fig. 6. This shaft carries a bevel gear 180 engaging a similar gear 181 on a shaft 182 which in turn is connected by bevel gears 183 and 184 to a shaft 185 carrying the pinion 173 corresponding to the similarly numbered pinion in Fig. 6. The pinion 173 engages another pinion 186 on a shaft 187 mounted in a bracket 188 depending from the disk 178. The shaft 187 carries a gear 189 engaging a gear 190 on a screw shaft 191 which is rotatably mounted in diametrically arranged lugs 192 projecting from the disk 178. The screw shaft carries a block 193 slidably mounted in a slot in the disk 178 lying below and parallel to the screw shaft. The block 193 carries a pin 194 carrying at its other end a block 195, the lower portion of which fits within a slot 196 in a T-shaped slide 197 provided with a rack 198 engaging a pinion 199 attached to an output shaft 200. The upper portion of the block 195 fits within a slot 201 in one arm of an L-shaped slide 202 supported in guide ways 203 and 204. The other arm of the slide is provided with a rack 205 engaging a pinion 206 attached to another output shaft 207.

In the operation of the component solver just described, assuming that values of elevation, A, are being introduced by the input shaft 168, the disk 178 will be correspondingly turned to alter the angular relation in the device of the screw shaft 191 in accordance with such values. Assuming the shaft 165 to be normally fixed, the side 166' of the differential will be held fixed through the gears 174 and 175. The rotation of shaft 168 will, through gears 176 and 177, turn the side 166'' and also the center 166'''. The movement imparted to the latter element will, through shaft 172, gears 180 and 181, shaft 182, gears 183 and 184 and shaft 185, turn the pinion 173 to compensate for the motion which would be imparted to the pinion 186 by the turning of the disk 178 if the pinion 173 were held fixed. In other words, since the pinion 173 turns in unison with the disk 178 no movement is imparted to the pinion 186 and the parts driven therefrom so that the radial position of the pin 194 is unaltered, as should be the case since the input shaft 165 is assumed to be fixed.

If, on the other hand, the input shaft 168 be regarded as fixed and the input shaft 165 be turned in accordance with changing values of $dH$, the side 166'' of the differential will be likewise fixed so that the movement imparted to the side 166' from the shaft 165 by gears 174 and 175, will move the center 166'''. The shaft 172 will be turned accordingly and drive the pinion 173 through the previously described shafts and gears. Since the disk 178 is now fixed, the pinion 173 will drive the pinion 186, shaft 187, gears 189 and 190 to turn the screw shaft 191 and correspondingly position the block 193 and pin 194. The operation of component solver 171 in positioning slides 197 and 202 is similar to the operation of component solver 21 in positioning slides 48 and 53. Because the value $dH$ introduced into component solver 171 has both plus and minus values the pin 194 is mounted and driven so that it may pass across the center of the disk 178 whereas pin 45 is movable in only one direction from the center of disk 42. By setting disk 178 relative to pinion 170 so that the screw shaft 191 is parallel to the slot 196 in slide 197 when the value of A represented by the angular position of shaft 168 is zero, it will be seen that the motion imparted to the slide 197, and therefore, to the output shaft 200 by the block 195, will be in accordance with the quantity $dH \sin A$. The movement imparted to the slide 202 and the output shaft 207 will be in accordance with the quantity $dH \cos A$, both of these outputs being employed as will hereinafter appear.

The shaft 58 entering Fig. 6 from Fig. 5, and which is actuated in accordance with the quantity $dR_H$ by the component solver 21, is connected to the side 208' of a differential 208. The other side 208'' is connected by a shaft 209 to the shaft 151 operable in accordance with values of elevation A. The shaft 151 is also connected by a shaft 169' to a pinion 170' for actuating an element of a second component solver 171'. The center 208''' of the differential is connected by shaft 172' to a pinion 173' for actuating another element of the component solver. The component solver 171' is structurally identical with the component solver 171 and, therefore, is likewise disclosed in detail in Fig. 13. For convenience the parts of this second component solver 171' which appear in Fig. 6, will be designated by the same reference numerals as are the corresponding parts of the other component solver, but with primes affixed, and the same rule applies to the input shafts 169' and 172' and their pinions 170' and 173' respectively.

In the component solver 171' the pin 194' is positioned radially in accordance with the quantity $dR_H$. By setting disk 178' relative to pinion 170' so that the screw shaft 191' is parallel to the slot 196' in slide 197' when the value of A represented by the angular position of shaft 168 is zero, it will be seen that the movement imparted to the slide 197' is in accordance with the quantity $dR_H \sin A$ and the movement imparted to the slide 202' is in accordance with the quantity $dR_H \cos A$, as will be evident from the previous explanation of the component solver 171. Except for the different inputs, $dH$ in the case of component solver 171 and $dR_H$ in the case of component solver 171'—, the operation of component solvers 171 and 171' is identical.

In as far as the differential 208 is concerned, it is identical with and performs the same function as does the differential 166 used in connection with the component solver 171, so that further explanation of the second differential is unnecessary.

The output shaft 200 of the component solver 171, which is operated in accordance with the quantity $dH \sin A$, is connected to the side 210' of a differential 210. The output shaft 207' of the component solver 171', which is operated in accordance with the quantity $dR_H \cos A$, is connected to the side 210'' of the differential. The center 210''' of the differential is, therefore, actuated in accordance with the sum of these quantities which, as appears from Equation 1 above, gives the quantity $dR$ representing the rate of change of range.

By means of a shaft 211 this quantity is applied to a variable speed mechanism 212 hereinafter designated as a range integrator. This integrator may be of the type shown in Patent No. 1,317,915, Hannibal C. Ford, for Mechanical movement, and is shown herein in simplified form. A shaft 211' leads from the shaft 211 to the predicting apparatus which may be associated with this apparatus. The shaft 211 carries a pinion 213 engaging a rack bar 214 for adjusting radially of a disk 215 a carriage containing a pair of balls 216. The disk 215 is driven by a pinion 217 on a shaft 218 actuated in accordance with time, $t$, from a constant speed source of power. The movement imparted to the balls 216 from the disk 215 is transmitted to a roller 219 which is connected to the shaft 132 leading to Fig. 5. Since the disk 215 is driven in accordance with time and the movement imparted to the roller 219 depends upon the radial position of the balls with respect to the disk, i. e., upon the quantity $dR$, the output of the roller 219 will be in accordance with the product of these quantities or $\Delta R$ representing increments of range.

The shaft 133 leading from Fig. 5 and operable in accordance with range R from the knob 121 is, in Fig. 6, connected to a pinion 220 engaging a rotatable disk 221 provided with a cam groove 222 laid out radially in accordance with the reciprocal of range, i. e., $$\frac{1}{R}$$

Above the disk is a pair of fixed guide ways 223 within which is a slide 224, carrying a pin 225 fitting into the cam groove and, therefore, displaceable radially in accordance with the quantity $$\frac{1}{R}$$

as the disk 221 is rotated in accordance with the quantity R by shaft 133 and pinion 220. The slide 224 is connected by a rod 226 to a carriage containing a pair of balls 227 of an integrator 228, hereinafter referred to as the $$\frac{1}{R}$$

integrator, which is of the same type as the integrator 212. The disk 229 of the $$\frac{1}{R}$$

integrator is driven by means of a pinion 230 on the shaft 218 in accordance with time, $t$. The roller 231 is, therefore, driven in accordance with the product of $$\frac{1}{R}$$

and $t$, or $$\frac{t}{R}$$

which is the output of its shaft 232.

The output shaft 207 of component solver 171 which is operable in accordance with the quantity $dH \cos A$, is connected to the side 233' of a differential 233. The output shaft 200' of the component solver 171', which is operable in accordance with the quantity $dR_H \sin A$, is connected to the side 233'' of the differential 233. The center 233''' is therefore actuated in accordance with the sum of the quantities applied to its sides or in accordance with $RdA$ as appears from Equation 2. The center is connected by means of a shaft 234 to a pinion 235 engaging a rack bar 236 to shift the balls 237 of an integrator 238 hereinafter referred to as the elevation integrator. The disk 239 of this integrator is driven by a pinion 240 on the shaft 232, which as previously explained, is operable in accordance with the quantity $$\frac{t}{R}$$

Accordingly the output of the roller 241 is in accordance with the product of the quantities R$d$A and $$\frac{t}{R}$$

which gives increments of elevation ΔA. The roller 241 drives the shaft 152 leading to Fig. 5. A shaft 234' leads from shaft 234 to the predicting apparatus which may be associated with this apparatus.

The shaft 168, which as previously explained is driven in accordance with elevation A, drives a pinion 242 engaging a disk 243 provided with a cam groove 244 laid out in accordance with values of the secant of A. A pair of fixed guide ways 245 support a slide 246 carrying a pin 247 fitting into the cam groove and therefore displaceable radially by it in accordance with the values of secant A, as the disk is turned. By means of a rod 248 the motion imparted to pin 247 is transmitted to the balls 249 of an integrator 250, hereinafter referred to as the secant A integrator. The disk 251 of this integrator is driven by a pinion 252 on the shaft 232 which as previously explained is operable in accordance with the quantity $$\frac{t}{R}$$

The roller 253 of this integrator receives a movement proportional to the product of the quantities secant A and $$\frac{t}{R}$$

which movement is transmitted by shaft 254 to a pinion 255 engaging the disk 256 of an integrator 257 hereinafter referred to as the bearing integrator. The balls 258 of this integrator are positioned by means of a rack bar 259 engaged by a pinion 260 on the shaft 51 leading from the component solver 21 of Fig. 5. The movement imparted to the roller 261 will, therefore, be in accordance with the product of the quantities $$\frac{t}{R}$$

secant A and R$d$B$_N$, which will give increments of bearing ΔB which are applied to the shaft 117 leading to Fig. 5, since this shaft is connected with the roller 261.

In the operation of the apparatus described above, and assuming that the horizontal speed and true course of the target have been estimated, the knob 12 and shaft 13 will be pushed inwardly until the gears 14 and 15 are engaged. This operation will open the switch 70' to break the circuits of the motors 65 and 80. The knob 12 will be set in accodance with the estimated horizontal speed and a corresponding movement will be imparted to the shaft 16 and the side 18' of the differential 18. Assuming that the center 18''' is fixed, the movement will be transmitted to the side 18'' and the shaft 19 and pinion 20 to turn the disk 36 of the component solver 21 to position the pin 39 in accordance with the estimated horizontal speed of the target. The shaft 59 and side 60' of the differential 60 will be correspondingly turned to turn the side 60'' since the center 60''' will be held fixed as soon as contact arm 62 engages one of the fixed contacts 63. The motor 65 will, however, not be energized since its circuit is broken at the switch 70' as well as at the switches 110, 124 and 144. Through the shaft 72 and pinion 73 the pin 93 of the vector solver 86 will be similarly positioned in accordance with the estimated horizontal speed of the target.

The knob 22 and shaft 23 will be pushed inwardly until the gears 24 and 25 are in engagement whereupon the switch 68 will be opened to provide a break in the circuits of the motors 65 and 80, in the event that their circuits have been closed at the switch 70' by withdrawal of the knob 12 after the estimated horizontal speed of the target has been set up in the component solver 21 and the vector solver 86. The knob 22 will be set in accordance with the estimated true course of the target and through shaft 26, side 28' of the differential 28 will be correspondingly turned.

As previously explained, the pointer 118' will indicate the observed true bearing of the target. The knob 107 will then be turned to drive through shaft 108, gears 112 and 113 and shaft 115, side 116' of the differential 116. Assuming the side 116'' to be fixed, the center 116''' will drive the shaft 118 and the pointer 118' connected thereto. The knob 107 will be turned until the pointers coincide, which means that the shaft 118 and center 28''' of the differential 28 will be set in accordance with the observed true bearing of the target. Since the side 28' is set in accordance with the estimated true course of the target, the side 28'' will be moved in accordance with the estimated target angle and will, through shaft 29 and pinion 30, correspondingly position the disk 42 of the component solver 21 to position its pin 45 in accordance with this vector. At the same time the shaft 74 will turn the side 75' of the differential 75 to move the center 75''' until contact arm 77 engages one of the fixed contacts 78, the motor 80 not being energized as its circuit is broken at switch 68 as well as at switches 110, 124 and 144. The movement described above will then be imparted to the side 75'', shaft 84 and pinion 85 to correspondingly turn the disk 87 of the vector solver 86 to position its pin 93 in accordance with the estimated target angle.

As a result of the operations described above, the slides 48 of the component solver 21 and 96 of the vector solver 86, will be displaced in accordance with the component R$d$B$_N$ while the slides 53 of the component solver 21 and 101 of the vector solver 86 will be displaced in accordance with the quantity $d$R$_H$. During this positioning of the component slides of the vector solver, the shafts 99 and 106 will run idle, since the coils of the clutches 120 and 136 will be deenergized because their circuits will be open at the switches 68 and/or 70' as well as at the switches 110, 124 and 144.

After the initial setting of the elements of the component and vector solvers in accordance with the estimated speed of the target and the estimated target angle, the knobs 12 and 22 will be retracted to disconnect them from the shafts 16 and 26 respectively leading to the component and vector solvers and to close the switches 68 and 70' to permit the circuits of the motors 65 and 80 to be subsequently established by the differentials 60 and/or 75 when the circuits have been also established at one or more of the switches 110, 124 and 144. The movement imparted to the slide 48 of the component solver 21 is transmitted through pinion 50 and shaft 51 to position the balls 258 of the bearing integrator 257 which generates the bearing ΔB, which through shaft 117 moves the side 116'' of the differential 116. Assuming the side 116' to be fixed the center 116''' will be correspondingly turned to displace shaft 118 and pointer 118'. If the pointer 118' departs from coincidence with the pointer 118'' it indicates that the observed and generated true bearings do not agree.

If the generated true bearing is wrong, it is due to errors in the rate at which this bearing is generated by the bearing integrator 257. Since one of the inputs of this integrator is the quantity $RdB_N$ which is applied to the integrator by the shaft 51, it may mean that there is an error in this factor which is due to errors in the speed of the target and/or the target angle as set up in the component solver. In order to correct the error in the generated true bearing it is necessary to correct the error in the $RdB_N$ output of the component solver which in turn requires a correction of the errors in the estimated speed of the target and/or the estimated target angle. Since one of the factors on which the target angle depends is the true bearing of the target, any correction to the true bearing as generated in the apparatus must be applied to the target angle in addition to any correction of the target angle due to errors in the estimated course or speed of the target.

Upon observing a departure of pointers 118' and 118'' from coincidence the knob 107 is pushed inwardly to close the switch 110 and bring the gear 112 into engagement with the gear 114, under which conditions the gears 112 and 113 will still be in engagement on account of the width of the former. The closing of switch 110 establishes a circuit from the arms 62 and 77 of the differentials 60 and 75 respectively, through conductors 71 and 83 plus 71 respectively, to the switch 110 and from it to the − terminal of the source of supply. The closing of switch 110 will also establish a circuit from the + terminal of the source of supply through switches 70' and 70, conductor 69, switch 68, conductors 67, 137 and 138, the coils of the clutches 120 and 136, conductors 139, 140, 127 and 71, switch 110 and conductor 111 leading to the − terminal of the source of supply.

After the knob 107 has been moved inwardly as explained above, it is turned to drive the shaft 115, side 116' of the differential 116, center 116''', shaft 118 and pointer 118' to cause it to coincide with pointer 118'' driven in accordance with the observed true bearing. At the same time the shaft 118 will drive the center 28''' of the differential 28 and, assuming side 28' to be fixed, the side 28'' will be moved and with it the shaft 29 and pinion 30 to turn the disk 42 of the component solver 21 an amount corresponding to the correction in true bearing required to match the pointers 118' and 118''. As the shaft 29 rotates it will correspondingly drive the shaft 31 and the center 18'''' of the differential 18. Assuming the side 18' to be fixed, the side 18'' will transmit a corresponding movement to the shaft 19 and pinion 20 to turn the disk 36 of the component solver for the purpose explained in connection with Fig. 10. The rotation of shafts 29 and 19 will be transmitted by shafts 74 and 59 respectively to the sides 75' and 60' of the differentials 75 and 60.

Turning of the knob 107 to match the pointers 118' and 118'' will also turn gear 114 and shaft 119 which at this time will be connected to the shaft 99 of the vector solver 86 since the coil of clutch 120 is energized as previously explained. The movement of shaft 99 will, through pinion 98, displace the slide 96 to reposition the pin 93, the slide 101 being held fixed, since pinion 105 and shaft 106 are connected by the energized clutch 136 to the shaft 135 which is held fixed by the friction device 135'. As the pin 93 of the vector solver is repositioned, it will turn the disk 87 and through the pinion 85 and shaft 84, the side 75'' of the differential 75 will be correspondingly turned. As previously explained the side 75' has been turned in accordance with the movement of shaft 29. The difference between the movements of the two sides of the differential will, through the center 75''' and shaft 76, turn the contact arm 77 into engagement with one of the fixed contacts 78 to establish through the corresponding conductor 79 the circuit of the motor 80 since its common conductor 82 is connected by conductor 67, switch 68, conductor 69 and switches 70 and 70' to the + terminal of the source of supply. The motor 80, will through its shaft 81, drive the side 28' of the differential 28, and assuming its center 28''' to be fixed, the side 28'' will be correspondingly driven as will the shafts 29 and 74 until the side 75' of the differential 75 matches the side 75'' to cause the arm 77 to open the motor circuit. This correctional movement of the shaft 29 will be applied through pinion 30 to the disk 42 of the component solver 21 to reposition the disk and therefore the pin 45 in accordance with the amount by which the pin 93 of vector solver 86 has been repositioned by turning knob 107.

The repositioning of pin 93 will also cause a displacement of the carriage 90 of the vector solver which will drive the pinion 73 and shaft 72 leading to the side 60'' of the differential 60. The difference between this movement and that imparted to the side 60' from the shaft 19 will, through the spider 60''' and shaft 61 turn the contact arm 62 into engagement with one of the contacts 63 to establish over the corresponding conductor 64 the circuit of the motor 65, the remainder of which circuit is the same as traced in connection with motor 80. The actuation of the motor 65 will, through shafts 66 and 16, drive the side 18' of the differential 18 and regarding the center 18''' as fixed, the other side 18'' will through shaft 19 and pinion 20 turn the disk 36 of the component solver 21 to reposition the pin 39 and therefore the pin 45 in accordance with the repositioned position of pin 93 of the vector solver. When this condition is reached the sides 60' and 60'' of the differential 60 will be matched so that the contact arm 62 resumes its normal position and the circuit of motor 65 is opened.

The repositioning of the pin 45 of the component solver 21 causes a displacement of the slide 48 to change the $RdB_N$ output of the shaft 51. This will alter the position of the balls 258 of the bearing integrator 257 to change the output of the integrator as applied to shaft 117. Since this shaft is connected to the side 116'' of differential 116 and the side 116' may be regarded as fixed, the center 116''' will, through shaft 118, displace the pointer 118' in accordance with the new generated true bearing. If the correctional operation described above has been properly performed, this pointer will coincide with the pointer 118'' showing that the generated true bearing of the target is correct. If the pointers do not coincide, the correctional operation is repeated as many times as may be necessary to accomplish the desired result.

The previously explained corrections for errors in the generated true bearing of the target may be made independently of its elevation, but in the case of corrections for errors in the generated range of the target, and in its generated elevation, the latter quantity enters as a factor for the following reasons.

Assume a target at a relatively low elevation, less than 45° for instance, and approaching or travelling away from the observing station at a substantially constant height or altitude. In such a case, errors in the estimated speed of the target will be manifest primarily by differences between the generated and observed ranges, since the component of movement along the line of sight will be relatively great as compared with the component of movement perpendicular to the line of sight in a vertical plane containing the line of sight. On the other hand, in the case of a similarly moving target at a relatively high angle of elevation, above 45° for instance, the errors in estimated speed will be manifest primarily by differences between the generated and observed elevations, since the component of movement along the line of sight will be relatively small as compared with the component of movement perpendicular to the line of sight in a vertical plane containing the line of sight.

It is for the purpose of taking care of these two conditions that the cams 157 and 160 are provided in connection with the range and elevation knobs 121, 141, respectively, as previously described. The selection of the particular knob which shall be rendered ineffective under the conditions of operation is automatically determined in accordance with the elevation angle A of the target as will presently appear. In order to insure greater flexibility of operation the cams are arranged to provide a certain degree of overlap with respect to the knobs associated with them. That is, the cam for the range knob will be so designed as to allow this knob to be pushed inwardly when the elevation angle is somewhat greater than 45°, as for instance 50°, while the cam for the elevation knob 141, will allow it to be pushed inwardly when the elevation angle is somewhat less than 45°, for instance 40°.

As in the case of true bearing, another preliminary step in the operation of the apparatus is to adjust the elevation knob 141 in accordance with the observed elevation, as indicated by the pointer 150″, by turning the knob until the pointer 150′ coincides with the other pointer. This preliminary operation is performed by allowing the knob 141 to remain in its normally retracted position and turning it to drive shaft 142, gears 146 and 147, shaft 148 and side 149′ of the differential 149. The center 149‴ being assumed to be fixed, the side 149″ will be driven to move shaft 150 and pointer 150′ attached thereto. At the same time, through shaft 153, pinion 154 and gear sector 155, the shaft 156 will be turned to position the cams 157 and 160 so that the portion of greater radius of one of them shall lie in the path of one of the shafts 122 or 142, while the portion of greater radius of the other cam is lying out of the path of the other shaft, except when the elevation angle is within the limits of the overlap of the cams in which case both the knobs 121 and 141 and their associated shafts 122 and 142 respectively may be pushed inwardly.

The preliminary adjustment of the elements above described will also take place in the case of shaft 151 which is connected to shaft 150 and this will cause the initial elevation angle to be applied to the disk 178 of the component solver 171 by shafts 168 and 169 and pinion 170 as described in more detail in connection with Fig. 13.

Similarly the initial elevation angle will also be applied by shaft 169′ and pinion 170′ to the disk 178′ of the component solver 171′. The initial elevation angle will also be applied through shaft 168 and pinion 242 to the disk 243 which contains the groove 244 laid out in accordance with the secant of the elevation angle A.

Another preliminary operation is performed with respect to range by turning the knob 121 in its retracted position and through shaft 122, gears 128 and 129, shaft 130 and side 131′ of the differential 131 its center 131‴ will be driven, the side 131″ being assumed fixed. This will turn the shaft 133 until its pointer 133′ coincides with the pointer 133″ which indicates the initial observed range of the target. The movement imparted to shaft 133 will, through pinion 220, turn the disk 221 which is provided with the groove 222 laid out in accordance with the reciprocal of range.

Another step in the preliminary operation of the apparatus consists in setting the knob 164 in accordance with the estimated rate of change of height of the target, or its rate of climb, to turn shaft 165 to position the pin 194 of the component solver 171 as previously explained in connection with Fig. 13.

The initial setting of the pin 45 of component solver 21 in accordance with the estimated target angle and speed of the target, will displace the slide 53 in accordance with the $dR_H$ component corresponding to these estimated quantities. By pinion 57, shaft 58, differential 208 and shaft 172′, the pin 194′ of the component solver 171′ will be positioned as previously explained.

In Fig. 5, the cams 157 and 160 are shown in the positions they occupy when the apparatus is being used in connection with a target of relatively high elevation. Under these conditions the range knob 121 cannot be pushed inwardly, but it may be manipulated to maintain the pointer 133′ in coincidence with the pointer 133″ in order that the observed range may be applied as desired through shaft 133 and pinion 220 to the disk 221, so that the reciprocal of range $$\frac{1}{R}$$

may be continuously and correctly generated for positioning the balls 227 of the $$\frac{1}{R}$$

integrator 228, the output of which, $$\frac{t}{R}$$

is employed in the elevation integrator 238 and the secant A integrator 250.

As far as the elevation angle is concerned, a departure of the pointer 150′ from coincidence with the pointer 150″ indicates that the observed and generated elevation angles do not agree due to errors in the rate at which this elevation angle is being generated by the elevation integrator 238. Since one of the inputs of this integrator is the quantity $RdA$ which depends in part upon the quantity $dR_H \sin A$, any error in the quantity $dR_H$ due to an incorrect estimate of the speed of the target and/or the target angle as set up on the component solver 21, will affect the output of the elevation integrator. The error in the generated elevation angle may, therefore, be corrected by repositioning the pin 45 of component solver 21 to correspondingly change the $dR_H$ component of this solver to alter the output of the elevation integrator until the pointers 150' and 150'' maintain substantial coincidence.

This operation is performed by moving inwardly knob 141 and shaft 142 until the gears 146 and 162 are in engagement, the cam 160 permitting such movement. At the same time, the switch 144 will be closed to permit the circuits of the motors 65 and 80 to be established by the contact arms 62 and 77 respectively. This circuit is in part the same as previously described in connection with the switch 110 and in part through the conductors 127 and 145, switch 144 and conductor 111 to the — terminal of the source of supply. The closing of switch 144 will also establish a circuit from the + terminal of the source of supply through switches 70' and 70, conductor 69, switch 68, conductors 67, 137 and 138, the coils of the clutches 120 and 136, conductors 139, 140 and 145, switch 144 and conductor 111 to the — terminal.

After the knob 141 has been moved inwardly it will be turned to drive through shaft 142, gears 146 and 147 and shaft 148, the side 149' of the differential 149. Assuming the center 149''' to be fixed, side 149'' and shaft 150 will turn the pointer 150' until it coincides with the other pointer 150''. The correctional movement imparted to the shaft 150 will also be transmitted by the shaft 151 to the component solvers 171 and 171' as previously explained in connection with the initial setting of the apparatus.

When the knob 141 is turned under the assumed conditions the gear 146 will, through gear 162, shafts 163 and 135, clutch 136, shaft 106 and pinion 105, move the slide 101 of the vector solver 86 to reposition the pin 93. At this time the other slide 96 of the vector solver will be held fixed, since shaft 99 is connected by the clutch 120 to the shaft 119 which is held by the friction device 119'. The repositioning of pin 93 will, except in certain exceptional cases, cause a movement of carriage 90 to turn the pinion 73 and a turning of the disk 87 to turn the pinion 85. The movement of pinion 73 will, through shaft 72, turn the side 60'' of the differential 60. Assuming the other side 60' to be fixed, the center 60''' will be turned until the contact arm 62 engages one of the fixed contacts 63 to establish the circuit of the motor 65 as previously described. Also, as previously described, the motor will then, through shafts 66 and 16, differential 18 and shafts 19 and 59, drive the side 60' until the contact arm assumes its neutral position. The movement imparted to shaft 19 by this operation will, through pinion 20, alter the position of the disk 36 of the component solver 21.

The pinion 85 of the vector solver will, through shaft 84, turn the side 75'' and the center 75''' of the differential 75 until its contact arm 77 engages one of the fixed contacts 78 to establish a circuit of the motor 80, which, as previously described, will through its shaft 81, shaft 26, differential 28, shafts 29 and 74, drive the side 75' of the differential 75 until the contact arm assumes its neutral position. This operation will be accomplished by a turning of the disk 42 of the component solver 21 with the result that the pin 45 will be repositioned in accordance with the repositioning of pin 93 of the vector solver by readjustment of the slide 101 of the latter. The repositioning of the pin 45 will cause a readjustment of the slide 53 of the component solver 21 with consequent change in the $dR_H$ output applied to shaft 58. The movement thus imparted to shaft 58 will, as previously described, affect the position of pin 194' of the component solver 171' and this will, in turn, affect the position of its slide 197' and the movement of shaft 200' which represents the quantity $dR_H \sin A$. As a result of this operation, the $RdA$ input of the elevation integrator, as represented by the movement of shaft 234, will be altered to change the output $\Delta A$ as represented by the movement of shaft 152. The latter shaft will, through the center 149''' of the differential 149, displace the side 149'' and shaft 150 to displace pointer 150' more nearly into coincidence with the pointer 150'' depending upon the accuracy with which the correcting operation has been carried out. The continued coincidence of the pointers will indicate that the elevation angle as generated in the apparatus corresponds to the observed elevation angle.

If the target be at a relatively low elevation angle, the cam 160 will occupy such a position that the elevation knob 141 cannot be pushed inwardly, while the cam 157 will occupy such a position as to allow the knob 121 to be pushed inwardly to permit correctional operations similar to those just described, since the effect of the turning of knob 121 to drive the shaft 135 through gears 128 and 134 is the same as previously described in connection with the elevation knob 141, because the shaft 163 associated with this knob is connected to the shaft 135. The slide 101 and pin 93 of the vector solver 86 may, therefore, be repositioned by manipulation of the knob 121. For the reasons previously explained the pin 45 and slide 53 of component solver 21 will be correspondingly positioned to change the $dR_H$ output of this solver.

Since the $dR$ input of the range integrator 212 is dependent in part upon the quantity $dR_H \cos A$ as obtained from the component solver 171', an error in the quantity $dR_H$ will affect the $dR$ input of the range integrator and accordingly its $\Delta R$ output. When the latter output as applied to shaft 132 and differential 131 causes the pointer 133' to remain in coincidence with the pointer 133'', it will show that the generated range is correct and that the estimated course and speed which serve as a basis for this generated range, are also correct.

When the position of the cams 157 and 160 is such that both of the knobs 121 and 141 may be pushed inwardly, either of these knobs may be used at the will of the operator for performing the correctional operations described above, since the pinions 134 and 162 are connected to a common shaft leading to the vector solver, thus permitting repositioning of its pin 93 by manipulation of either knob.

Reference has previously been made to the stop 17 associated with the shaft 16 and the switch 70 which is adapted to be controlled by the movable member of the stop. In the foregoing explanation of the operation of the apparatus, it has been assumed that the switch 70 has been closed under the described conditions of operation, but in practice, under certain conditions of operation, the switch will be open. The movable member of the stop is arranged to engage the longer blade of the switch before it engages the member which constitutes the lower limit of the stop, that is, the right hand member shown in Fig. 5.

As previously explained, the pin 45 of the component solver 21, may go to the center of disk 42, as for instance, when the speed of the target is zero. In the manner explained above, the pin 93 of the vector solver 86 will also be similarly positioned with respect to the disk 87. Under this condition the slides 96 and 101 of the vector solver cannot be displaced to reposition the pin by manipulation of the shaft 119 by knob 107 or shaft 135 by knob 121, or knob 141, as the case may be. The movable member of the stop 17 is so related to the switch 70 that when by turning of shaft 16 the pin 45 of the component solver and the pin 93 of the vector solver approach their central positions, the switch 70 will be open to break the circuit of the coils of clutches 120 and 136 to deenergize the clutches and thereby disconnect the shafts 119 and 135 from shafts 99 and 106 respectively during the remaining movement of the slides as pin 93 goes to the center of disk 87. This arrangement prevents the apparatus from getting into a condition in which the rate control knobs 107, 121 and 141 would be ineffective for their intended purpose.

The operations have of necessity been described as taking place consecutively in a certain order, but it will be understood that in practice they may take place in any order or even more or less simultaneously according to the dictates of the fire control problem which is to be solved by the apparatus. In any event, the result will be the accurate determination of the course and speed of the target in order that these factors may serve as a basis for the accurate determination of other quantities dependent upon them, such as the rate of change of bearing $dB_N$, the rate of change of range $dR$ and the rate of change of elevation $dA$. These outputs of the apparatus are transmitted by the shafts 51, 211' and 234' respectively to other mechanism for predicting the future position of the target, which mechanism since it forms no part of the present invention is not shown herein. The apparatus further enables the generated values of bearing B, range R and elevation A to be kept substantially correct in order that the information furnished by these quantities may be available whenever the values of these quantities cannot be obtained by direct observation of the target.

While a preferred embodiment of the invention has been shown and described, it will be understood that the invention may be embodied in other forms and that various changes may be made in structural details without departing from its principles as defined in the appended claims.

I claim:

1. In a computing apparatus, a pair of mechanical vectors, component elements operatively related to each vector, common means for positioning the vectors, separate means for independently positioning the component elements related to one of the vectors and thereby repositioning that vector, and means under the control of the repositioned vector for correspondingly repositioning the other vector.

2. In a computing apparatus, the combination of a pair of mechanical vectors representing characteristics of the movement of an object, means for positioning the vectors, means independent of the positioning means for repositioning one of the vectors and means under the control of the repositioned vector for correspondingly positioning the other vector.

3. In a computing apparatus for use in gun fire control, a pair of mechanical vectors each representative of the course and speed of a target, component elements operatively related to each vector, common means for introducing estimated values of the course and speed of the target and thereby positioning both vectors, means for correcting the component elements related to one vector according to observed positions of the target and thereby repositioning that vector, and means under the control of the repositioned vector for correspondingly repositioning the other vector.

4. In a computing apparatus for use in gun fire control, a mechanical vector representative of the course and speed of a target, means associated therewith for resolving the vector into components, means for introducing estimated values of the course and speed of the target and thereby positioning the vector, means for introducing corrections in certain factors of the components according to observed positions of the target, means for converting the component corrections into correction values of the vector, and means for applying the correction values to the vector.

5. In a computing apparatus for use in gun fire control, a mechanical vector representative of the course and speed of a target, means associated therewith for resolving the vector into components, means for introducing estimated values of the course and speed of the target and thereby positioning the vector, means for converting the components into linear and angular rates representing components of movement of the target, means for generating from said rates a continuous indication of the position of the target, means for introducing corrections into said indication according to observed positions of the target, means for converting the said corrections into correction values of the vector, and means for applying the correction values to the vector.

6. In a computing apparatus for use in gun fire control, a mechanical vector representative of the course and speed of a target, means associated therewith for resolving the vector into components, means for introducing estimated values of the course and speed of the target and thereby positioning the vector, computing means receiving the components and operable in accordance therewith to generate linear and angular values defining the position of the target, means for introducing corrections into said values according to observed positions of the target, means for converting the corrections into correction values of course and speed, and means for applying the correction values to the vector.

7. In a computing apparatus, the combination of a mechanical vector representing characteristics of the movement of an object, means operable by the vector for resolving the vector into components bearing a predetermined relation to a datum line, a second mechanical vector representing the same characteristics of the movement of the object, means operable by the second vector for resolving the vector into components bearing the same predetermined relation to the datum line, means for displacing the second resolving means to alter the second vector and means operable by the second vector for correspondingly altering the first vector.

8. In a computing apparatus, the combination of a pair of mechanical vectors representing characteristics of the movement of an object, means for positioning the vectors, means operatively connected to one of the vectors for generating values of a quantity representing the position of the object, a comparing device for showing when the generated values of the quantity equal the observed values, means associated with the comparing means and independent of the positioning means for repositioning the second vector and means under the control of the second vector for correspondingly repositioning the first vector to affect the generating means operatively connected thereto.

9. In a computing apparatus, a mechanical vector representing the estimated course and speed of a moving object, means operatively connected to the vector for generating values of a quantity representing the position of the object, a comparing device for showing when the generated values of the quantity equal its observed values, a second mechanical vector representing the estimated course and speed of the object, means associated with the comparing device for altering the second vector in accordance with differences between the generated and observed values of the quantity and means operable by the second vector for correspondingly altering the first vector to affect the generating means operatively connected to the first vector.

10. In a computing apparatus, a mechanical vector representing the estimated course and speed of a moving object, means operable by the vector for resolving the vector into components bearing a predetermined relation to a datum line, mechanism operatively connected to the resolving means for generating values of a quantity representing the position of the object, a comparing device for showing when the generated values of the quantity equal its observed values, a second mechanical vector representing the estimated course and speed of the object, means operable by the second vector for resolving it into components bearing the same predetermined relation to the datum line, means associated with the comparing device for altering the second resolving means in accordance with differences between the generated and observed values of the quantity to alter the second vector, and means operable by the second vector for correspondingly altering the first vector and the resolving means operable thereby to affect the generating mechanism operatively connected to such resolving means.

11. In a computing apparatus, the combination of a device having a part settable in accordance with estimated values of target speed and target angle and elements operable by said part for resolving these values into components bearing a predetermined relation to the line of sight to the target, mechanism operable in part by the elements for generating values of quantities representing the position of the target, means for comparing the generated values of the quantities with observed values thereof, a second device having a part settable in accordance with the estimated values of target speed and target angle and elements operable by the part for resolving these values into components bearing a predetermined relation to the line of sight to the target, means associated with the comparing means for displacing the elements of the second device in accordance with differences between the generated and observed values of the quantities to alter the position of the part of the second device, means under the control of the part of the second device for correspondingly altering the position of the part of the first device and the elements operable thereby to cause correctional adjustments in the generating mechanism operable by these elements.

12. In a computing apparatus, the combination of a pair of devices each having a part settable in accordance with estimated values of target speed and target angle and elements operable by said part for resolving the values into components bearing a predetermined relation to the line of sight to the target, mechanism operable in part by the elements of one of the devices for generating values of quantities representing the position of the target, means for comparing the generated values of the quantities with observed values thereof, normally ineffective corrective means operable with the comparing means for displacing the elements of the other device in accordance with differences between the generated and observed values of the quantities to alter the position of the part of this device, means under the control of the part of the second mentioned device for correspondingly altering the position of the part of the first mentioned device and the elements operable thereby to cause correctional adjustments in the generating mechanism operable by these elements.

13. In a computing apparatus, the combination of a pair of devices each having a part settable in accordance with factors representing the movement of a target and elements operable by the part for determining the components of the factors in predetermined relations to the line of sight to the target, mechanism operable in part by an element of one of the devices for generating values of a factor representing the position of the target, means for comparing the generated values of the factor with observed values thereof, means associated with the comparing means for displacing an element of the other device in accordance with differences between the generated and observed values of the factor to alter the position of the part of this device, means under the control of the part of the second mentioned device for correspondingly altering the position of the part of the first mentioned device and the elements operable thereby to cause correctional adjustments in the generating mechanisms operable by these elements.

14. In a computing apparatus, the combination of a component solver including an element, means for setting the element in accordance with estimated values of the target speed and target angle and a slide operable by the element, mechanism operable in part by the slide for generating values of a factor representing the position of the target, means for comparing the generated values of the factor with observed values thereof, a vector solver including an element, means for setting the element of the vector solver in accordance with estimated values of the target speed and target angle and a slide also included in the vector solver, means associated with the comparing means for displacing the slide of the vector solver in accordance with differences between the generated and observed values of the factor to alter the position of the element of the vector solver, means under the control of the element of the vector solver for correspondingly altering the position of the element of the component solver and the slide operable thereby to cause correctional adjustments in the generating mechanism operable by the last mentioned slide.

15. In a computing apparatus, the combination of a component solver having an element, means for setting the element in accordance with values of a factor and a slide operatively related to the element, a vector solver having an element, means for setting the element of the vector solver in accordance with the values of the factor and a slide operatively related to the element of the vector solver, means for displacing the slide of the vector solver and the element related thereto and means under the control of the element of the vector solver for correspondingly displacing the element of the component solver and thereby the slide related to this element.

16. In a computing apparatus, the combination of a component solver having an element, means for setting the element in accordance with values of a factor and a pair of slides operatively related to the element, a vector solver having an element, means for setting the element of the vector solver in accordance with the values of the factor and a pair of slides operatively related to the element of the vector solver, means for displacing the slides of the vector solver and the element related thereto and means under the control of the element of the vector solver for correspondingly displacing the element of the component solver and thereby the slides related to this element.

17. In a computing apparatus, the combination of a component solver having a pin and a slide operatively related to the pin, means for setting the pin in accordance with the values of a factor, a vector solver having a pin and a slide operatively related to each other, means operable by the setting means for setting the pin of the vector solver in accordance with the values of the factor, a clutch having driving and driven elements, means for actuating the driving element, an operating connection between the driven element and the slide of the vector solver, means under the control of the setting means for disconnecting the elements of the clutch when the pins of the solvers are being set by the setting means, means under the control of the actuating means for connecting the elements of the clutch whereby the operation of the actuating means will displace the slide of the vector solver and the pin related thereto and means under the control of the pin of the vector solver for correspondingly displacing the pin of the component solver and thereby the slide related to this pin.

18. In a computing apparatus, a plurality of means respectively actuated in accordance with the estimated course and the estimated speed of a target, mechanism responsive thereto to be set in accordance with a resultant evaluation of the estimated course and speed of the target, means for resolving said resultant evaluation into linear components thereof, transformation means to transform said components into certain other components of movement of the target comparable with observable components thereof, means for checking said transformed components with said observable components and correcting said transformed components, means for converting said corrections into linear correction values of the course and speed of the target, and means for applying those correction values to said mechanism.

19. In a computing apparatus, a plurality of means respectively actuated in accordance with the estimated course and the estimated speed of a target, mechanism responsive thereto to be set in accordance with a resultant evaluation of the estimated course and speed of the target, means for resolving said resultant evaluation into linear components thereof, transformation means to transform said components into certain other components of movement of the target comparable with observable components thereof, means for checking said transformed components with said observable components, a second mechanism, and means operable to set the same in accordance with the corrections of the transformed components, said second mechanism acting to correct the values of the course and speed of the target represented by said first mechanism.

20. In a computing apparatus, a pair of mechanisms, means for setting each of said mechanisms in accordance with the estimated course and speed of a target, means related to one of said mechanisms for determining from the setting thereof linear components of the course and speed of the target, transformation means to transform said components into equivalent angular components of the movement of the target, means settable in accordance with observed measures of said angular components, means for checking and correcting the transformed components from the observed measures, means for converting the corrections into corrections for the linear components and applying the latter corrections to the first mechanism, and means bringing said first mechanism into agreement with the second mechanism to correct the estimated course and speed.

21. In a computing apparatus, the combination of a component solver having a vector element and component slides operatively related to the element, a vector solver having a vector element and component slides operatively related to the element, means normally operable for setting both vector elements in accordance with estimated values of the course and speed of a target, means for setting a member in accordance with the bearing of the target, means for setting a member in accordance with the range of the target, means for setting a member in accordance with the elevation angle of the target, connectable means selectively operable for adjusting the position of one of the slides of the vector solver in accordance with movement of the bearing setting means, connectable means selectively operable for adjusting the second slide of the vector solver in accordance with movement of the range setting means and the elevation setting means, power means under the control of the slides of the vector solver and energized only when the connectable means are selectively operated for adjusting the elements of the component solver and the vector solver, and means controlled by the member settable in accordance with elevation for preventing simultaneous adjustment of the second slide of the vector solver by the range setting means and by the elevation setting means.

RAYMOND E. CROOKE.